United States Patent [19]

Schuster et al.

[11] 4,117,211
[45] Sep. 26, 1978

[54] ELECTRIC STORAGE BATTERY, PARTICULARLY FOR VEHICLES

[75] Inventors: Heinz Schuster, Hagen; Rolf Prange, Iserlohn, both of Fed. Rep. of Germany

[73] Assignee: Varta Batterie Aktiengesellschaft, Fed. Rep. of Germany

[21] Appl. No.: 786,230

[22] Filed: Apr. 11, 1977

[30] Foreign Application Priority Data

Apr. 17, 1976 [DE] Fed. Rep. of Germany ....... 2617016

[51] Int. Cl.² .............................................. H01M 2/30
[52] U.S. Cl. ................................... 429/121; 429/178; 429/184
[58] Field of Search ............... 429/178, 180, 181, 184, 429/185, 174, 121, 122; 174/18, 77 R, 151, 152 R

[56] References Cited

U.S. PATENT DOCUMENTS

| 3,064,068 | 11/1962 | Fouch ................................. 429/180 |
| 3,678,178 | 7/1972 | Hubbauer et al. ............... 429/121 X |

Primary Examiner—Anthony Skapars
Attorney, Agent, or Firm—Weiser, Stapler & Spivak

[57] ABSTRACT

Battery with terminal posts having low resistance, high-strength tubular loop inserts. A lead receptacle encircled by a synthetic plastic molding surrounds the post. A weldment bead is between the post and the lead receptacle. Preferably the top of the post is rectangular and the connector cable crimped into the insert protrudes at about 45° from the battery.

6 Claims, 5 Drawing Figures

U.S. Patent     Sept. 26, 1978     4,117,211
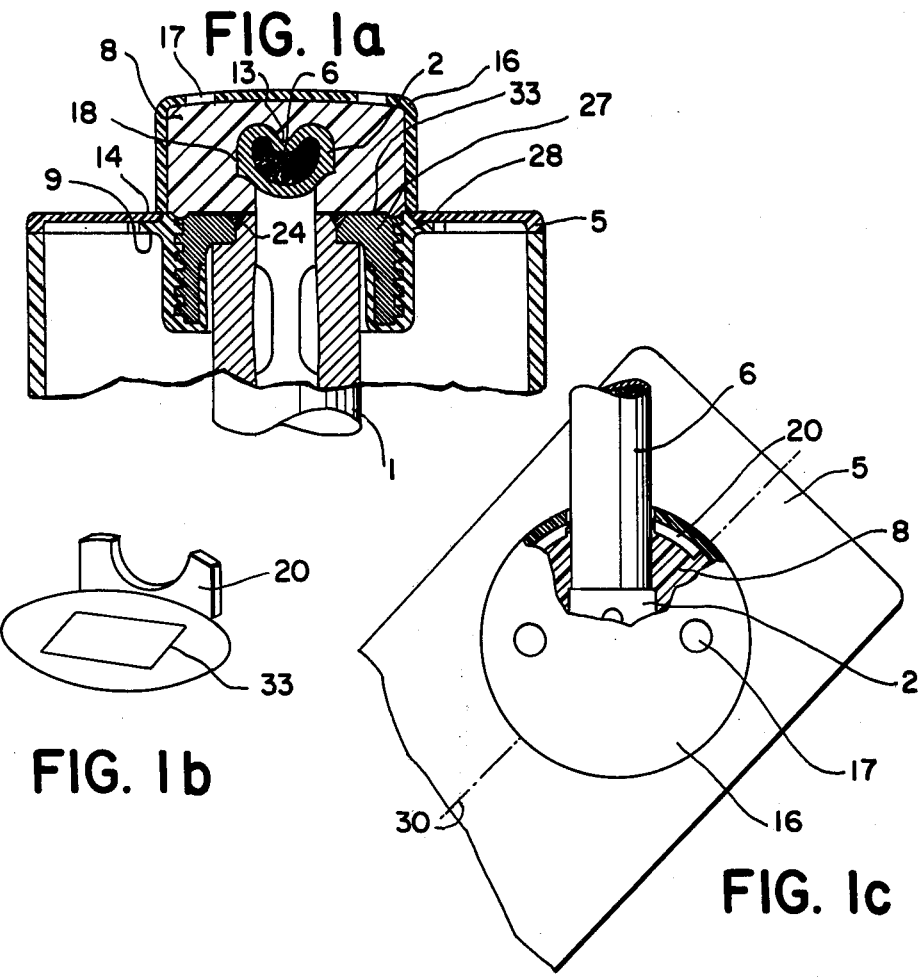
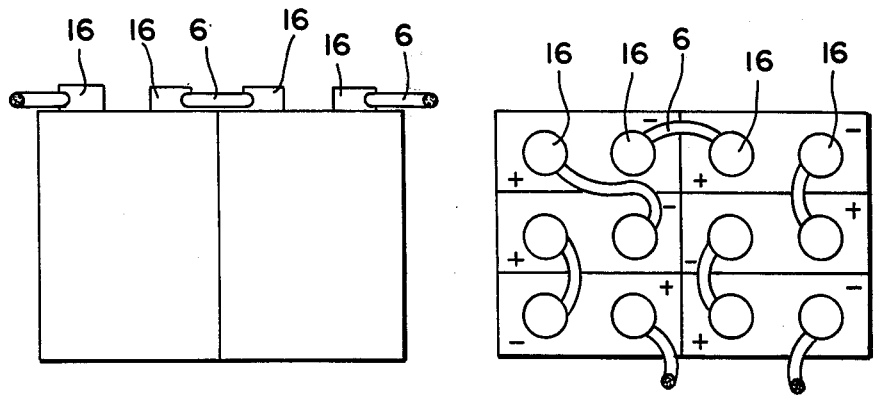

ELECTRIC STORAGE BATTERY, PARTICULARLY FOR VEHICLES

The invention relates to an electric storage battery, particularly a lead storage battery for vehicles, whose terminal posts have an insert of metal with lower electrical resistance and higher mechanical strength than lead. Also, the ends of these inserts protruding from the terminal posts are in the form of a tubular loop whose axis is approximately at right angles to the axis of these terminal posts, as taught in German patent application P 26 05 446.6, published Aug. 18, 1977, as well as in German Utility Model (Gebrauchsmuster) application GNo. 75 24 020.9, published Jan. 27, 1977 and in corresponding U.S. patent application Ser. No. 705,515 filed July 15, 1976.

The purpose of the invention is the provision of pole connections between the individual cells of a storage battery which are as flexible as possible and simultaneously rugged, and in which good electrical conductivity is obtained. The latter is assured in accordance with the above-identified applications by the above-mentioned metal insert into the terminal posts, which is preferably made of copper.

Vehicle cells are subjected to exceptional mechanical stresses, particularly shocks, which lead to premature fatigue effects in their materials. It has previously been sought to alleviate such stresses by means of elastic pole connectors, for example, by means of cables.

However, new problems arise from the requirement that the structural height of the storage battery cells be kept as low as possible. The structural height of the electrical connections between the cells should likewise be as small as possible. At the same time, the reliability of operation of the cells under the influence of the mechanical shocks should not be jeopardized.

Accordingly, it is an object of the present invention to provide between the terminal post and its lead-through through the housing lid an improved closure or seal having mechanical durability.

It is another object to provide a better connection between the tubular loop and the connector.

These and other objects which will appear are achieved in accordance with the invention by surrounding the terminal posts with a lead box encircled by a synthetic plastic molding. The synthetic plastic molding has a ring-shaped shoulder for the application of a housing lid. Between the terminal post and the lead box, at the level of the ring-shaped shoulder, a weldment bead is provided.

In a preferred embodiment the terminal post is given a rectangular cross-section at the level of the weldment bead, in order to achieve the greatest possible strength. The cable connection extending from the terminal post is oriented at an angle of about 45° to the cell axis of the storage battery.

A particular advantage of arrangements in accordance with the invention is the great stability of the cable connection and the high elasticity of connections between the cells. By virtue of the cable connection oriented at an angle of 45° to the cell axis, a plurality of electrical interconnections of the individual cells into a battery become possible.

For further details, reference is made to the discussion which follows in the light of the accompanying drawings, wherein FIG. 1a shows a cross-sectional view of a terminal post connection embodying the invention, FIG. 1b shows details of one element of this connection of FIG. 1a, FIG. 1c is a partially broken-away top view of the terminal, FIG. 2 shows an elevation of two interconnected cells, and FIG. 3 shows a top view of a battery formed of a plurality of cells.

The same reference numerals are used to designate corresponding elements in the several figures.

Referring to FIG. 1a, the terminal post 1 has a tubular loop 2. This tubular loop is provided at its lower end with a tool seat 18 for better application of the tool which produces crimp 13 in cable connection 6. Before insertion of cable connection 6, lid 5 is applied to the cell housing. The finished lid 5 consists of the lid top in which there is a lead receptacle 27 with sythetic plastic encircling molding 28. The synthetic plastic encircling molding 28 is welded to lid 5 by ultrasonics. Between receptacle 27 and molding 28 there are provided ridges which, after first being coated with an adhesive, are enclosed in electrolyte-tight manner by synthetic plastic encircling molding 28. After mounting of lid 5, the terminal post 1 whose upper portion is of rectangular cross-section is welded with lead to lead receptacle 27. As shown in FIG. 1b, this lead receptacle 27 has a rectangular aperture 33. By means of weldment bead 24, completely electrolyte-tight sealing of cell lid 5 is achieved.

Tubular loops 2 are covered by a cap 16. Cap 16 has at its lower skirt edge an encircling rim 14, which is attached by being simply pressed down into an annular groove extending between housing lid 5 and annular shoulder 9. Additional stability is provided by insertion of potting or sealing compound 8 in the filler or measurement holes 17 of cap 16. Preferably, the material which is used as the sealing compound is of hardenable synthetic plastic. Sealing compound 8 thus encloses tubular loop 2 as well as a portion of the cable connector 6.

As shown in FIG. 1c, the rectangle of terminal post 1 and the rectangular aperture in lead receptacle 27 are so positioned that cable connector 6 can be oriented at an angle of 45° to cell axis 30. This yields a simple construction having a high degree of elasticity for the pole connections and also capable of a variety of connections. In vehicle applications the pole connections are capable of operating even under shock, without the connection points between the tubular loops 2 and the cable connectors 6 coming loose.

The half shell 20 which is preferably attached to the synthetic plastic encircling molding forms, together with a corresponding recess in cap 16, an enclosure for cable connector 6. This reliably prevents escape of the sealing compound 8, which is liquid during its application.

As shown in FIG. 1b the half shell 20 is so oriented relative to rectangle 33 that the half shell 20 is adjacent one of the long sides of rectangle 33.

FIG. 2 shows a side elevation of two cells whose terminal posts are electrically connected by a cable connection 6. This figure reveals the low structural height of the cell connector which is provided by the cable connectors 6 extending at right angles to the axis of the terminal posts. However, in this figure only caps 16 of the terminal posts are visible.

In FIG. 3 there are shown various possible connections between terminal post which are capable of being provided in simple manner by the cable connector 6 oriented at a 45° angle to the cell axis.

We claim:

1. An electric storage battery having terminal posts with inserts of a metal of lower electrical resistance and higher mechanical strength than lead, the inserts having ends protruding form the terminal posts and in the form of a tubular loop with its axis at approximately a right angle to the axis of the post, wherein the terminal post is surrounded by a lead receptacle having a synthetic plastic encircling molding, the synthetic plastic molding having a ring-shaped shoulder for application of a housing lid, and a weldment bead filling the space between the terminal post and the lead receptacle at the level of the shoulder.

2. The battery of claim 1 wherein
the terminal post has polygonal cross-section at the level of the weldment bead.

3. The battery of claim 1 wherein
the terminal post is rectangular in its upper portion and the lead receptacle has a rectangular aperture, a diagonal of the rectangular aperture being parallel to the cell axis.

4. The battery of claim 3 further having
a connecting cable which is oriented at about 45° to the cell axis.

5. The battery of claim 1 wherein
the molding has a half shell and the half shell has a recess for receiving a connecting cable.

6. The battery of claim 1 wherein
the tubular loop is covered by a cap having an annular skirt rim which is attached between the housing lid and the ring-shaped shoulder.

* * * * *